(12) United States Patent
Bahrami et al.

(10) Patent No.: US 9,177,277 B2
(45) Date of Patent: Nov. 3, 2015

(54) WORKFLOW MODELING WITH WORKLETS AND TRANSITIONS

(71) Applicant: The Boeing Company, Chicago, IL (US)

(72) Inventors: Ali Bahrami, Sammamish, WA (US); Changzhou Wang, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/016,095

(22) Filed: Aug. 31, 2013

(65) Prior Publication Data

US 2013/0346141 A1 Dec. 26, 2013

Related U.S. Application Data

(63) Continuation-in-part of application No. 11/158,037, filed on Jun. 21, 2005, now Pat. No. 8,527,938.

(51) Int. Cl.
*G06F 9/44* (2006.01)
*G06Q 10/06* (2012.01)

(52) U.S. Cl.
CPC ................ *G06Q 10/06316* (2013.01)

(58) Field of Classification Search
CPC ............................................. G06Q 10/06316
USPC ....................................................... 705/7.26
See application file for complete search history.

(56) References Cited

U.S. PATENT DOCUMENTS

| | | | | |
|---|---|---|---|---|
| 7,970,786 B2* | 6/2011 | Bahrami | ........... | G06F 17/30967 707/779 |
| 8,527,938 B2* | 9/2013 | Bahrami | ............... | G06Q 10/06 717/104 |
| 8,799,316 B1* | 8/2014 | Bahrami | ........... | G06F 17/30967 707/779 |
| 2004/0078777 A1* | 4/2004 | Bahrami | ............... | G06Q 10/10 717/105 |
| 2006/0288330 A1* | 12/2006 | Bahrami | ............... | G06Q 10/06 717/116 |
| 2010/0262451 A1* | 10/2010 | Bahrami | ........... | G06Q 10/0633 705/7.27 |
| 2013/0346141 A1* | 12/2013 | Bahrami | .......... | G06Q 10/06316 705/7.26 |

OTHER PUBLICATIONS

Informatica, How do we call shell scripts from informatica?, GeekInterview (Published May 27, 2005) retrieved from http://www.geekinterview.com/question_details/253 on Oct. 20, 2014.*

* cited by examiner

*Primary Examiner* — Don Wong
*Assistant Examiner* — Theodore Hebert
(74) *Attorney, Agent, or Firm* — Hugh P. Gortler

(57) ABSTRACT

A computer is used to generate an approximation of a workflow in terms of worklets and transitions. Each worklet represents a phase of work in the workflow. Each transition indicates conditions for completion of a worklet. Each worklet includes at least one assistlet having executable code that will be executed for approximating of its work phase.

20 Claims, 4 Drawing Sheets

WORKFLOW MODELING WITH WORKLETS AND TRANSITIONS

This is a continuation-in-part of copending U.S. Ser. No. 11/158,037 filed 21 Jun. 2005, now U.S. Pat. No. 8,527,938 issued 3 Sep. 2013.

BACKGROUND

Traditional workflow management systems are suited for well defined activities, such as manufacturing, where the processes tend to be more established and stable. Such modeling typically requires a detailed understanding of the various processes Sometimes, however, a detailed understanding of complex processes simply isn't available during design time. Sometimes, processes are ad-hoc or ill defined such that information needed during design time can only be determined during run time. Sometimes processes requirements are changed after design time.

SUMMARY

According to an embodiment herein, a method comprises using a computer to generate an approximation of a workflow in terms of worklets and transitions. Each worklet represents a phase of work in the workflow. Each transition indicates conditions for completion of a worklet. Each worklet includes at least one assistlet having executable code for approximating performance of its work phase.

According to an embodiment herein, a computer comprises a worklet execution engine programmed to generate a model a workflow in terms of worklets and transitions. Each worklet represents a phase of work in the workflow. Each transition indicates conditions for completion of a worklet. Each worklet is assigned at least one assistlet having executable code for approximating performance of a task in the work phase.

According to an embodiment herein, an article comprises non-transitory machine-readable memory for causing a computer to function as a worklet execution engine that generates a model of a workflow in terms of worklets and transitions. Each worklet represents a phase of work in the workflow. Each transition indicates conditions for completion of a worklet. The worklet execution engine also assigns assistlets to the worklets. The assistlets have executable code for approximating performance of tasks in the work phases.

These features and functions can be achieved independently in various embodiments or may be combined in yet other embodiments further details of which can be seen with reference to the following description and drawings.

DETAILED DESCRIPTION

Figure 5:
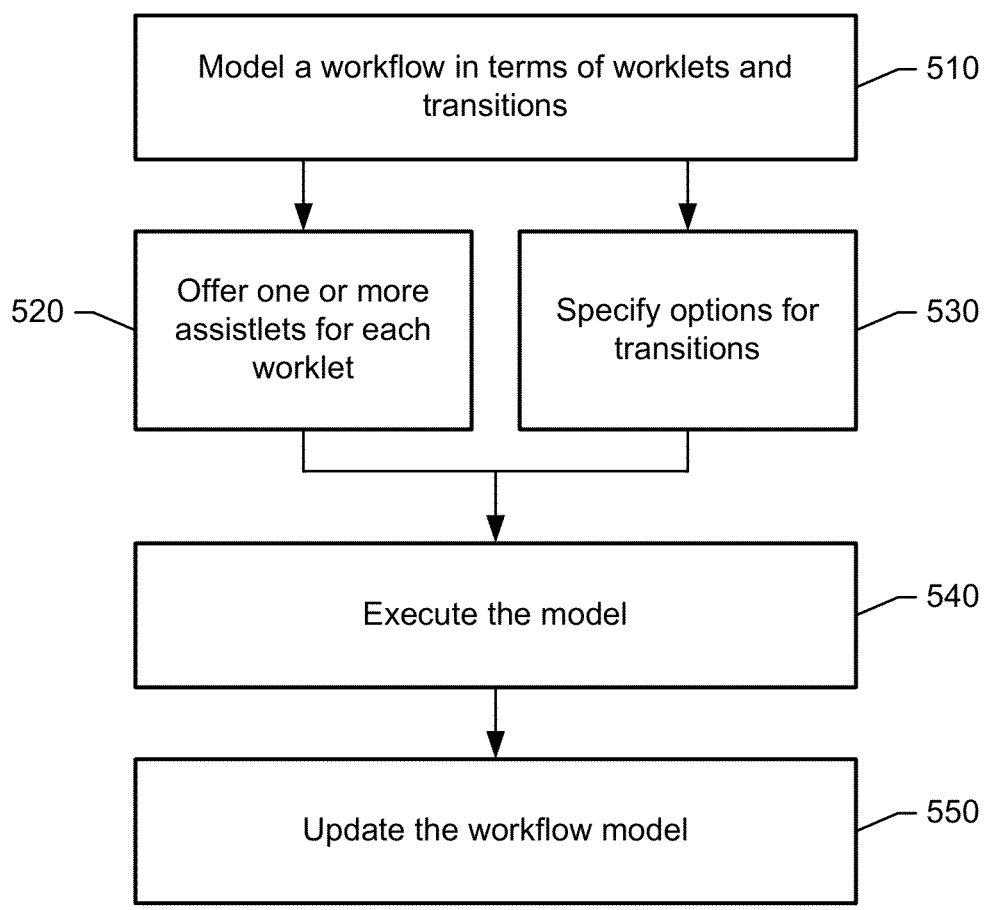
FIG. 5 is an illustration of a method for modeling a workflow in terms of worklets and transitions.

Reference is made to FIG. 5. At block 510, a computer is used to model a workflow in terms of worklets and transitions. As used herein, a worklet represents a phase of work in a workflow. Examples of work phases performed on a computing device include "retrieve email," "prepare a new document according to a template," "save the document," etc. Each worklet quantifies inputs, tasks, and outputs associated with its work phase. A task can be manual or automated. For example, a worklet may quantify relevant work that is accomplished on a computing device. The worklet may be associated with tools used by people to accomplish the work, input data, and artifacts or output data created by the computing device.

Each transition specifies one or more boundaries or conditions for completion of a worklet. For example, if a transition determines that a boundary condition is satisfied, the workflow will proceed to the next worklet. Otherwise, if the boundary or condition is not met, the workflow continues with the current worklet.

At block 520, for each worklet that is selected, the computer offers one or more assistlets associated with the worklet. Each worklet is modeled by one or more assistlets. As used herein, an assistlet is executable code (e.g., program, script, macro, services) for approximating performance of the work phase (e.g., runtime of tasks performed during the work phase, information used by the tasks during the work phase, outputs at the end of the work phase). An assistlet does not represent the actual flow of a task.

There may be different ways of modeling a worklet. That is, there may be several distinct and suitable sequences of assistlets that will accomplish the phase of work represented by the worklet. This inherently allows flexibility in selecting alternative sequences.

There may be different types of assistlets. Two types include application assistlets and system assistlets. System assistlet are used to simulate system operations. Examples of system assistlets include, but are not limited to, rule engine, set state, publish, and subscribe. Application assistlets are built by a user with domain knowledge. Examples of application assistlets include, but are not limited to, filter, semantic query, sensor, email, and monitor.

Assistlets may have different states. States include, but are not limited to, activated, not-activated, done, failed and suspended.

Assistlets may be implemented as web services. Web services are available software components (e.g., components available on the Internet) that provide certain services of general interest. Examples include search services and link analysis services. For example, the workflow associated with an analyst depends upon environmental factors such as the availability of databases and the content of information. The task associated with performing link analysis may be provided as a web service.

At block 530, for each transition that is selected, the computer offers one or more options for specifying when a worklet has been completed. Options may be process-based, event-based, rule-based and calendar-based. As examples, process-based options may be based on the completion of a work phase, calendar-based options may be based on a schedule, and rule-based options may be based on the state of certain data.

At block 540, the workflow model is executed. As the assistlets of each worklet are executed, the status of the system changes and different operations may be monitored in real time. Simulation of the workflow model may be used to determine information needs. It can identify parts of a system that need to be changed in order to satisfy information needs. The simulation can provide information such as expected completion times and confidence based upon real-time system resources (processing and network). It enables a user to select the workflow appropriate to specific needs and constraints.

A particular worklet may be changed at run time. Say the worklet was modeled to use certain information at design time, but that information is no longer needed at run time. The worklet may be changed by skipping specific phases of work that utilized that's information.

At block 550, the workflow model may be updated. As more actual information about the workflow is learned, uncertain elements in the workflow model may become better understood. Worklets may be replaced with versions that better approximate their work phases. Sequences of assistlets can be replaced with new sequences that better approximate the work phases. Transitions can be modeled more accurately. This provides more opportunity for adaptability since workflows herein are not as rigid as conventional workflows.

Thus, the initial workflow model generated at blocks 510-530 may be little more than a rough approximation. Over time, the workflow model is improved at block 550 to better reflect the actual workflow.

Figure 1:
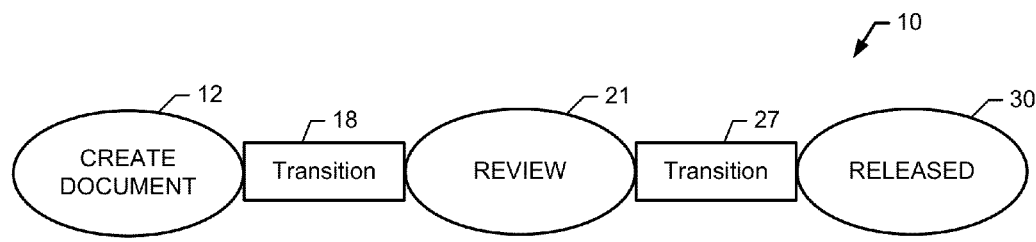
FIG. 1 is an illustration of a workflow model including worklets and transitions.

Reference is made to FIG. 1, which illustrates an example of a workflow model 10 for publication of a document. The workflow is described in terms of three phases: document creation, document review and document release. The model 10 includes three corresponding worklets: a first worklet 12 labeled "create document"; a second worklet 21 labeled "Review"; and a third worklet 30 labeled "Released."

The workflow model 10 further includes a first transition 18 between the first and second worklets 12 and 21, and a second transition 27 between the second and third worklets 21 and 30. Not shown is a third transition, which may be used to terminate the third worklet 30, but its presence may be presumed in the workflow model 10.

The first worklet 12 may be accomplished through a first sequence 15 of assistlets. For example, the first sequence 15 of assistlets may include operator interactions such as supplying a password to allow access to a server on the intermittent network link (not shown), and it may include tasks such as "insert CD ROM."

The work phase associated with the first worklet 12 is not necessarily accomplished only by the first sequence 15 of assistlets. The work phase may be accomplished by alternative sequences. For the example of FIG. 1, however, the first sequence 15 was provided as a choice and was selected.

Figure 2:
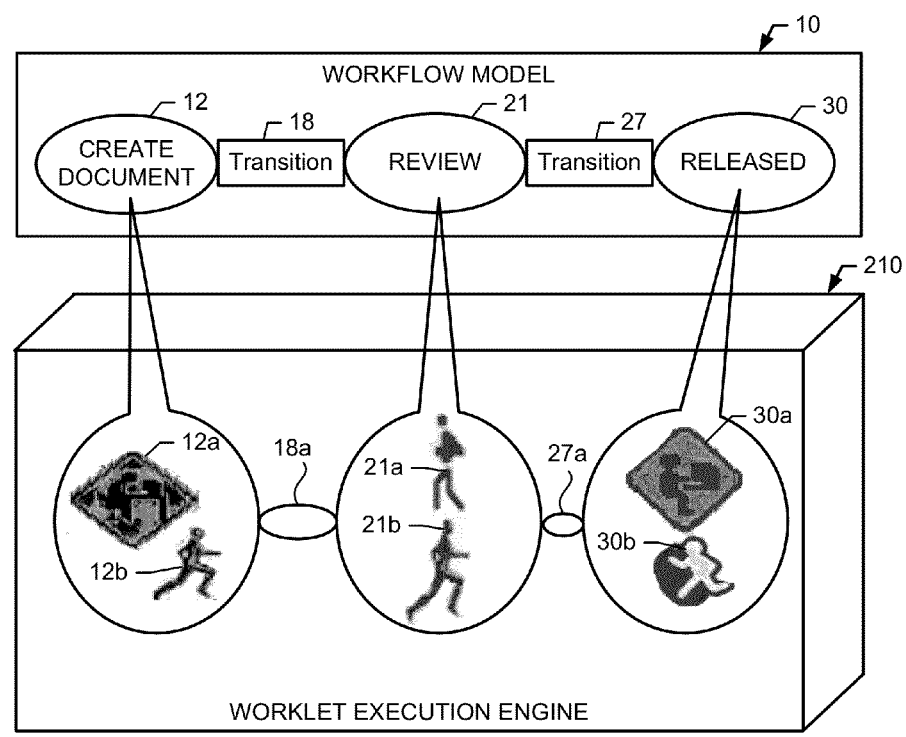
FIG. 2 is an illustration of a workflow model including, worklets, assistlets, and transition.

Referring to FIG. 2, a computer may be programmed with a worklet execution engine 210 for creating a workflow model 10 in terms of worklets and transitions. For instance, the worklet execution engine 210 enables a user to select the first worklet 12. The worklet execution engine 210 then places a first icon 12a and a second icon 12b to form an ordered pair. The worklet execution engine 210 then assigns a sequence of assistlets that correspond to the first and second icons 12a and 12b.

The worklet execution engine 210 then enables selection of the second worklet 21. The worklet execution engine 210 then places a third icon 21a and a fourth icon 21b to form an ordered pair. The worklet execution engine 210 then assigns a sequence of assistlets that correspond to the third and fourth icons 21a and 21b.

The worklet execution engine 210 then enables selection of the third worklet 30. The worklet execution engine 210 then places a fifth icon 30a and a sixth icon 30b to form an ordered pair. The worklet execution engine 210 then assigns a sequence of assistlets corresponding to the fifth and sixth icons 30a and 30b.

The assistlets may be selected from a library of assistlets. For example, a worklet corresponds to the work phase of "retrieving email" and its associated assistlets include a first assistlet configured to draw email from a first email address on a first server. A new assistlet can be configured from the first assistlet by changing the first email address on the first server to a second email address on a second server.

The worklet execution engine 210 enables selection of the first transition object 18. The worklet execution engine 210 places a first transition icon 18a between the first icon 12a and the second icon 21a. Similarly, it places a second transition icon 27a between the third icon 30a and the second icon 21a. The worklet execution engine 210 then allows a user to specify conditions for the transition icons 18a and 27a.

Figure 3:
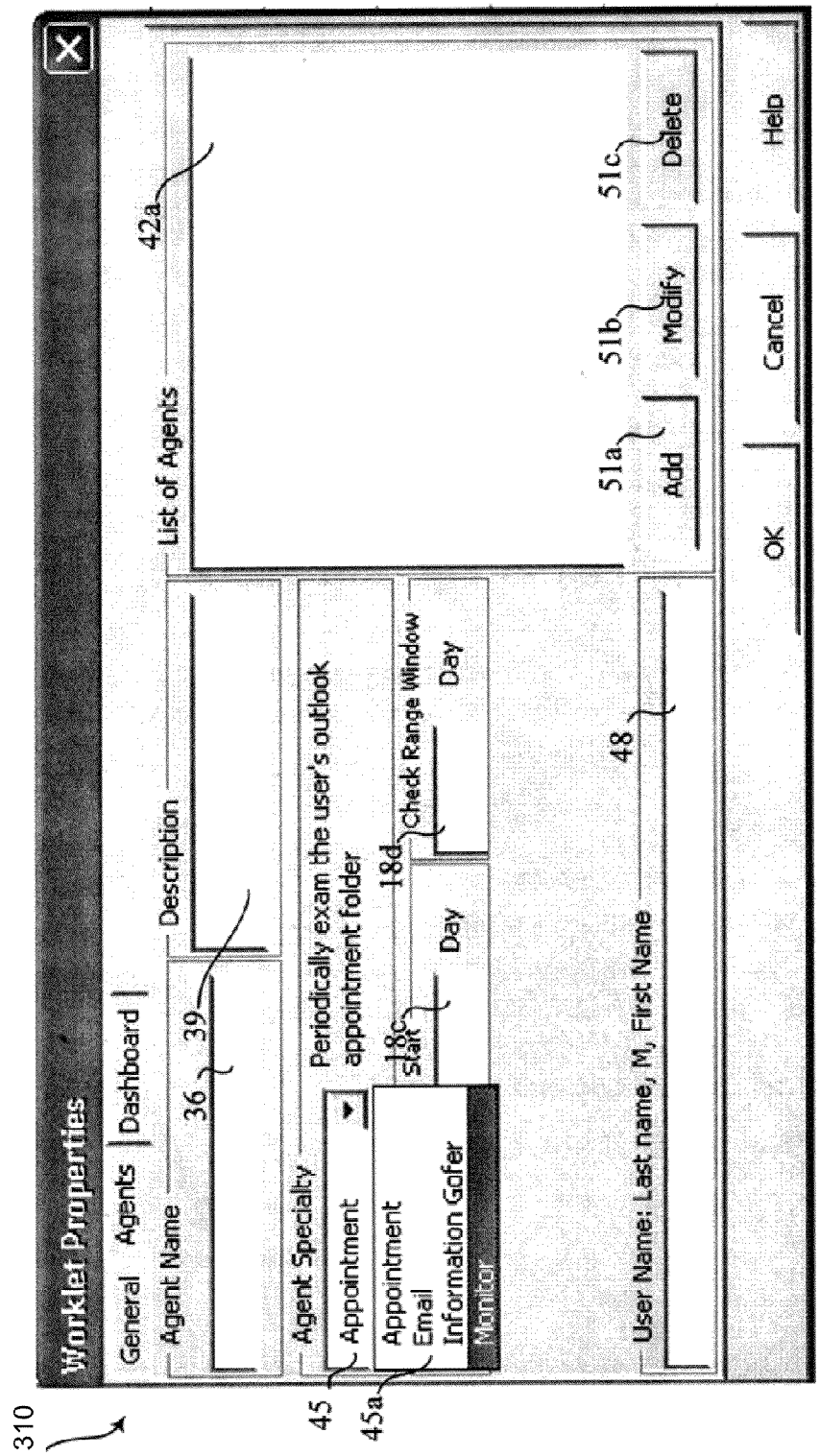
FIG. 3 is an illustration of a dialogue box configured to edit a worklet.

Reference is now made to FIG. 3, which illustrates an example of a dialogue box 310 generated by the worklet execution engine 210. The dialogue box 310 enables a user to select one or more assistlets (or agents as used in FIG. 3) for a worklet. The worklet dialog box 310 includes an opportunity to name a suitably modified assistlet in a fill-in window 36, and to include a description in a description fill-in window 39. The worklet may be associated with various assistlets by modifying an existing assistlet selected from a list of assistlets appearing in an assistlet window 42a and suitable interaction with the worklet dialogue box 310.

Classes of assistlets may be defined according to an assistlet specialty that occurs in the assistlet specialty window 45. For example, the dialogue box 310 of FIG. 3 further facilitates the programming of a worklet by filling in the specialty window 45 according to a specialty selected from a drop-down list 45a. To associate the worklet with a particular user profile, a user name fill-in window 48 facilitates the creation and exploitation of a user profile associated with a user designated in the user name fill-in window 48.

The worklet dialog box 310 further facilitates exploitation of the relationship between worklets and assistlets by including buttons, such as an "add" button 51a which when activated adds an assistlet as configured according to the windows 36, 39, 45, and 48 when a selected worklet is highlighted in the assistlet window 42a. A "modify" button allows editing of a worklet highlighted in the assistlet window 42a. A "delete" button 51c allows removal of a worklet highlighted in the assistlet window 42. Outdated worklets may be removed.

Figure 4:
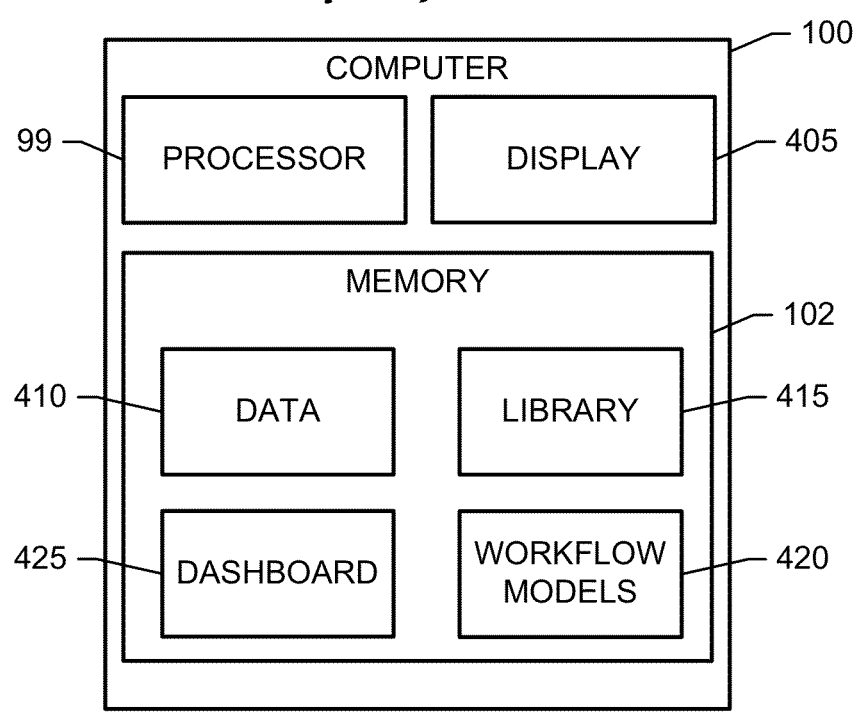
FIG. 4 is a block diagram of a computer for performing workflow modeling with worklets and transitions and also for executing workflow models.

Reference is now made to FIG. 4, which illustrates a computer 100 including a processor 99, computer-readable memory 102, and a video monitor 405. The memory 102 stores data 410 that, when executed, causes the processor 99 to function as the worklet execution engine. The worklet execution engine may display a graphical user interface (including, but not limited to, the dialog box of FIG. 3) on the video monitor 405 and receive user inputs for modeling a workflow in terms of worklets and transitions.

The worklet execution engine may also store and access transitions, worklets and assistlets in a library 415. The library 415 may be local (as shown in FIG. 5) and/or remote. The library 415 enables a "common ground" environment such that relations between different workflow models are preserved as assistlets are developed. It also provides a framework for associating assistlets with suitable worklets, and creating a sequence of assistlets that achieves a worklet.

The library 415 may contain specialized assistlets that are configurable in both a design time environment and in a run time environment. An example is a library of web services that perform certain tasks, such as checking inventory.

The worklet execution engine may also provide a template based development. Skeleton assistlet implementation may support common assistlet operations and web service interfaces.

The data 410 may also cause the processor 99 to store one or more workflow models 420 in the memory 102. The worklet execution engine may also execute a workflow model 420.

The worklet execution engine may generate and display a dashboard 425 to report observed execution of the workflow model during runtime. The worklet execution engine may also control and observe the flow of worklets as well as execute when a worklet is invoked.

Thus disclosed is workflow modeling that relaxes the need for details during design time. Because modeling is performed in terms of worklets transitions, the modeling forces the separation of work practices from work processes. The worklets and the tasks they entail may be divorced from implementation details. Modeling may be performed with less details and more uncertainty. This provides more opportunity for adaptability since flows are not as rigid as conventional workflow systems.

The workflow modeling herein provides sufficient flexibility to cope with unexpected situations, failures and other dynamic situations. Changes to an original workflow model may be applied at runtime. Adaptive workflow is beneficial for the deployment of process that can quickly respond to changing conditions.

The invention claimed is:

1. A computer-implemented method comprising: generating an approximation of a workflow in terms of worklets and transitions, each worklet representing a phase of work in the workflow, each transition indicating conditions for completion of a worklet, each worklet including at least one assistlet having executable code for approximating performance of its work phase;
   executing the assistlets;
   monitoring and determining information needs of the workflow approximation; and
   identifying parts of the workflow that need to be changed in order to satisfy the information needs.

2. The method of claim 1, wherein the worklets and transitions are arranged in an ordered sequence.

3. The method of claim 1, wherein each assistlet approximates runtime of the work phase and determines information needed during performance of the work phase.

4. The method of claim 1, wherein the assistlets include at least one of systems assistlets that simulate computer systems operations and applications assistlets that simulate computer applications.

5. The method of claim 1, further comprising providing an interface that enables user-selection of the worklets and transitions and that selects the assistlets for the selected worklets.

6. The method of claim 5, wherein the interface is used to select the assistlets from a library.

7. The method of claim 6, wherein the interface is used to modify the selected assistlets.

8. The method of claim 1, further comprising generating libraries of the worklets, transitions, and assistlets.

9. The method of claim 1, wherein the assistlets simulate at least one of operations and applications in a computer system.

10. The method of claim 1, further comprising updating the approximation with a version that better approximates the workflow.

11. A computer comprising a worklet execution engine programmed to:
    generate a model of a workflow in terms of worklets and transitions, each worklet representing a phase of work in the workflow, each transition indicating conditions for completion of a worklet, each worklet assigned at least one assistlet having executable code for approximating performance of a task in the work phase;
    execute the assistlets;
    monitor and determine information needs of the tasks; and
    identify parts of the workflow that need to be changed in order to satisfy the information needs.

12. The computer of claim 11, wherein the worklet execution engine is further programmed to provide an interface that enables user-selection of the worklets and transitions.

13. The computer of claim 12, wherein the worklet execution engine is further programmed to select the assistlets from a library.

14. The computer of claim 11, wherein the worklet execution engine is further programmed to update the model with a version that better approximates the workflow.

15. An article comprising non-transitory machine-readable memory for causing a computer to function as a worklet execution engine that generates a model of a workflow in terms of worklets and transitions, each worklet representing a phase of work in the workflow, each transition indicating conditions for completion of a worklet; assigns assistlets to the worklets, the assistlets having executable code for approximating performance of tasks in the work phases; executes the assistlets; monitors and determines information needs of the tasks; and identifies changes that need to be made to satisfy the information needs.

16. The article of claim 15, wherein the worklet execution engine provides an interface that enables user-selection of the worklets and transitions.

17. The article of claim 15, wherein the worklet execution engine selects the assistlets from a library.

18. The article of claim 15, wherein at least one of the assistlets approximates runtime of the work phase.

19. The article of claim 15, wherein the worklet execution engine updates the model with a version that better approximates the workflow.

20. The article of claim 15, wherein the assistlets include at least one of systems assistlets that simulate computer systems operations and applications assistlets that simulate computer applications.

* * * * *